United States Patent
Cavalli et al.

(10) Patent No.: US 8,331,236 B2
(45) Date of Patent: Dec. 11, 2012

(54) METHOD TO BALANCE TRAFFIC LOAD BETWEEN NEARBY LTE/WIMAX CELLS GROUPED INTO INNER AND BORDER CONSTELLATIONS

(75) Inventors: Simona Cavalli, Ispra (IT); Fabrizio Zizza, Novara (IT)

(73) Assignee: Nokia Siemens Networks S.p.A., Cassina de Pecchi (MI) (IT)

( * ) Notice: Subject to any disclaimer, the term of this patent is extended or adjusted under 35 U.S.C. 154(b) by 751 days.

(21) Appl. No.: 12/439,453

(22) PCT Filed: Aug. 27, 2007

(86) PCT No.: PCT/EP2007/007489
§ 371 (c)(1),
(2), (4) Date: Sep. 21, 2009

(87) PCT Pub. No.: WO2008/025502
PCT Pub. Date: Mar. 6, 2008

(65) Prior Publication Data
US 2010/0014426 A1   Jan. 21, 2010

(30) Foreign Application Priority Data
Aug. 30, 2006 (EP) .................... 06425599

(51) Int. Cl.
*G01R 31/08* (2006.01)
(52) U.S. Cl. ........ 370/235; 370/312; 370/328; 455/453; 455/436; 455/442; 455/443; 455/445
(58) Field of Classification Search .................. None
See application file for complete search history.

(56) References Cited

U.S. PATENT DOCUMENTS
6,385,449 B2 * 5/2002 Eriksson et al. ............. 455/436
(Continued)

FOREIGN PATENT DOCUMENTS
EP   1 058 473 A1   12/2000
(Continued)

OTHER PUBLICATIONS
Velayos ("Load Balancing in Overlapping Wireless LAN Cells", 2004 IEEE).*
(Continued)

*Primary Examiner* — Kibrom T Hailu
(74) *Attorney, Agent, or Firm* — Staas & Halsey LLP

(57) ABSTRACT

The embodiments disclose a method for balancing traffic load between nearby cells of a mobile radio communication network, e.g. WiMAX Forum stage 2, 3 specifications or 3GPP UMTS Long Term Evolution (LTE), where cells are configured as peer network nodes interconnected by a transport network, e.g. an IP backbone preferably with multicast capability. In a preliminary off line step a) nearby cells are grouped into inner and border constellations. The first ones include group of nearby cells, not necessarily hosted by the same base station site, and belonging to a well defined geographic area, which are characterized by a common target utilization and by a common guard threshold for traffic load measured value. The second ones include the set of cells which are at the border between two inner constellations; target utilization and guard threshold are not defined, instead and cells actually belong to more than one inner constellation and have visibility over their target utilization and guard threshold parameters. Successively, in each constellation are executed the following on line steps: b) among all cells are exchanged their actual and residual traffic load status; c) all cells calculate the average actual traffic load into the constellation and compare it to their actual traffic load; d) cells with actual traffic load over the average book unreserved adjacent cells with the lowest actual traffic load and the highest residual traffic load as targets for traffic offloading; e) each booking cell command a fraction of its mobile terminals to execute handovers towards respective target cells accepting to be reserved; f) the reserved cells are released. Border constellation cells are enabled to trigger traffic offloading only when the average actual traffic load of the neighbor constellation is lower than its target utilization parameter.

9 Claims, 14 Drawing Sheets

From WiMAX Forum stage 2 specification: "*Figure 7-92 - RRA and RRC Collocated in BS*"

U.S. PATENT DOCUMENTS

| | | | |
|---|---|---|---|
| 6,445,924 B1* | 9/2002 | Rasanen | 455/437 |
| 6,542,482 B1* | 4/2003 | Johansson et al. | 370/331 |
| 2003/0147389 A1* | 8/2003 | Zirwas | 370/390 |
| 2005/0090257 A1* | 4/2005 | Kroner et al. | 455/436 |

FOREIGN PATENT DOCUMENTS

| | | |
|---|---|---|
| EP | 2006/006033 | 12/2006 |
| WO | 98/52375 | 11/1998 |
| WO | 99/45734 | 9/1999 |

OTHER PUBLICATIONS

Velayos H. et al., "Load balancing in overlapping wireless LAN cells", Communcations, 2004 IEEE International Conference on Paris, France Jun. 20-24, 2004, Piscataway, N J, USA, pp. 3833-3836, XP010712397, ISBN: 0-7803-8533-0.*

Velayos H. et al., "Load balancing in overlapping wireless LAN cells", Communcations, 2004 IEEE International Conference on Paris, France Jun. 20-24, 2004, Piscataway, NJ, USA, pp. 3833-3836, XP010712397, ISBN: 0-7803-8533-0.

3GPP TS 23.060 V8.1.0(Jun. 2008) $3^{rd}$ Generation Partnership Project: Techincal Sepcification Group Services and System Aspects; General Packet Radio Service (GPRS); Service description; Stage 2 (Release 8).

3GPP TS 23.228 V7.4.0(Jun. 2006) $3^{rd}$ Generation Partnership Project: Techincal Sepcification Group Services and System Aspects, IP Multimedia Subsystem (IMS) Stage 2 (Release 7).

WiMAX Forum stage 2 application: "Figures 7-92-RRA and RRC Collocated in BS", Mar. 28, 2007 (Release 1.0.0).

* cited by examiner

From WiMAX Forum stage 2 specification: "Figure 7-92 - RRA and RRC Collocated in BS"

From WiMAX Forum stage 3 specification: "Figure 5-26 - Inter-ASN RRM Communication is RRC to RRC Communication"

From WiMAX Forum stage 3 specification: "Table 5-43 - RRM Procedures, Messages, Mapping to Reference Points"

| RRM primitives | Communication peers | Profile A | Profile C | Inter-ASN (profile independent) |
|---|---|---|---|---|
| Per-BS Spare Capacity Request and Report | RRC – RRC | R4 | R4 and R6 | R4 |
| | RRC – RRA | R6 | None (BS internal) | None (RRC-RRA is ASN internal) |
| Neighbor BS Resource Status Update | RRC – RRA | R6 | None (BS internal) | None (RRC-RRA is ASN internal) |
| Per-MS PHY Parameters Request and Report | RRC – RRA | R6 | None (BS internal) | None (RRC-RRA is ASN internal) |

FIG. 3

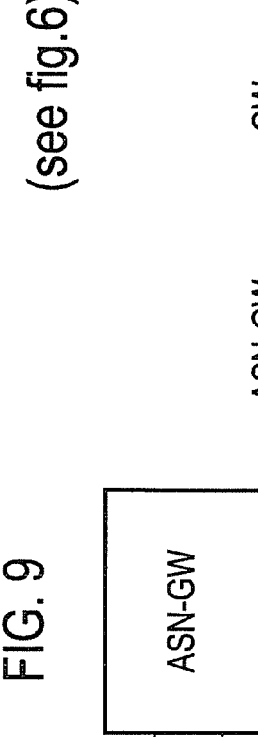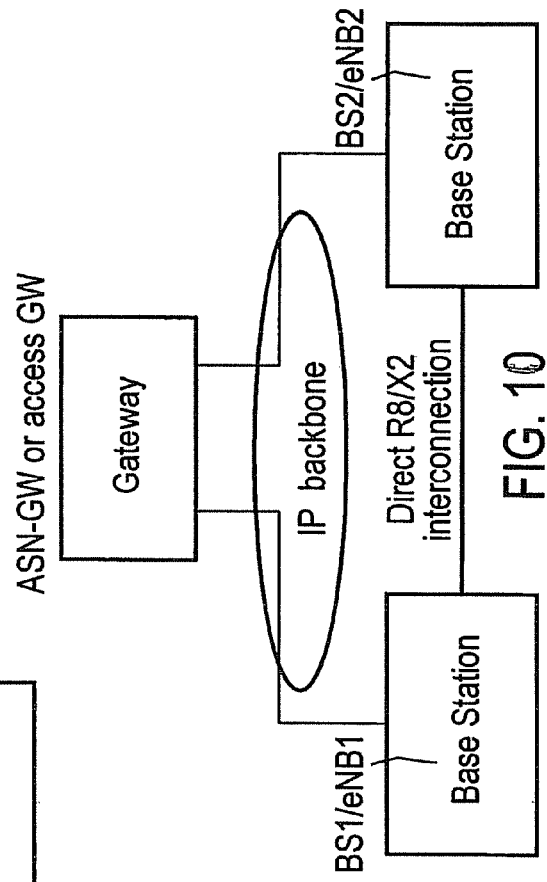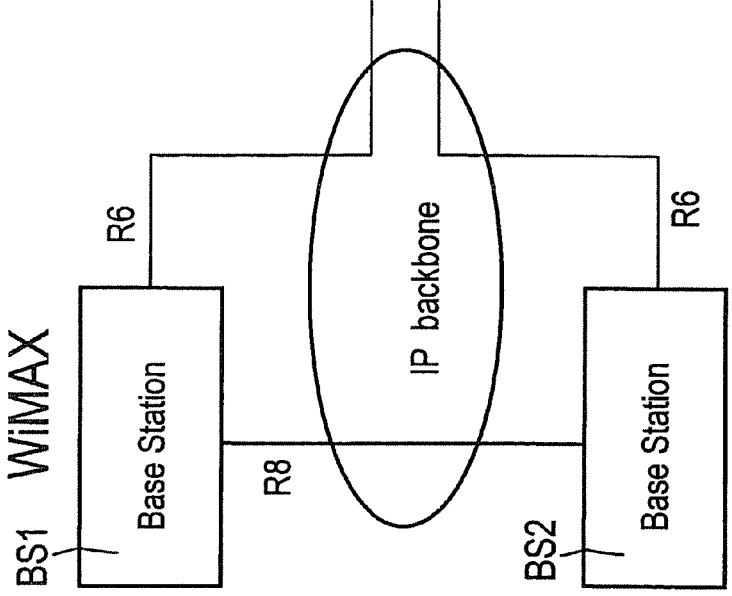

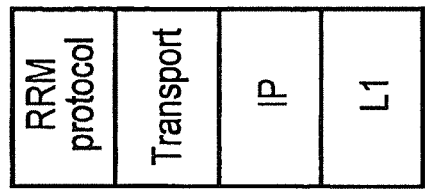
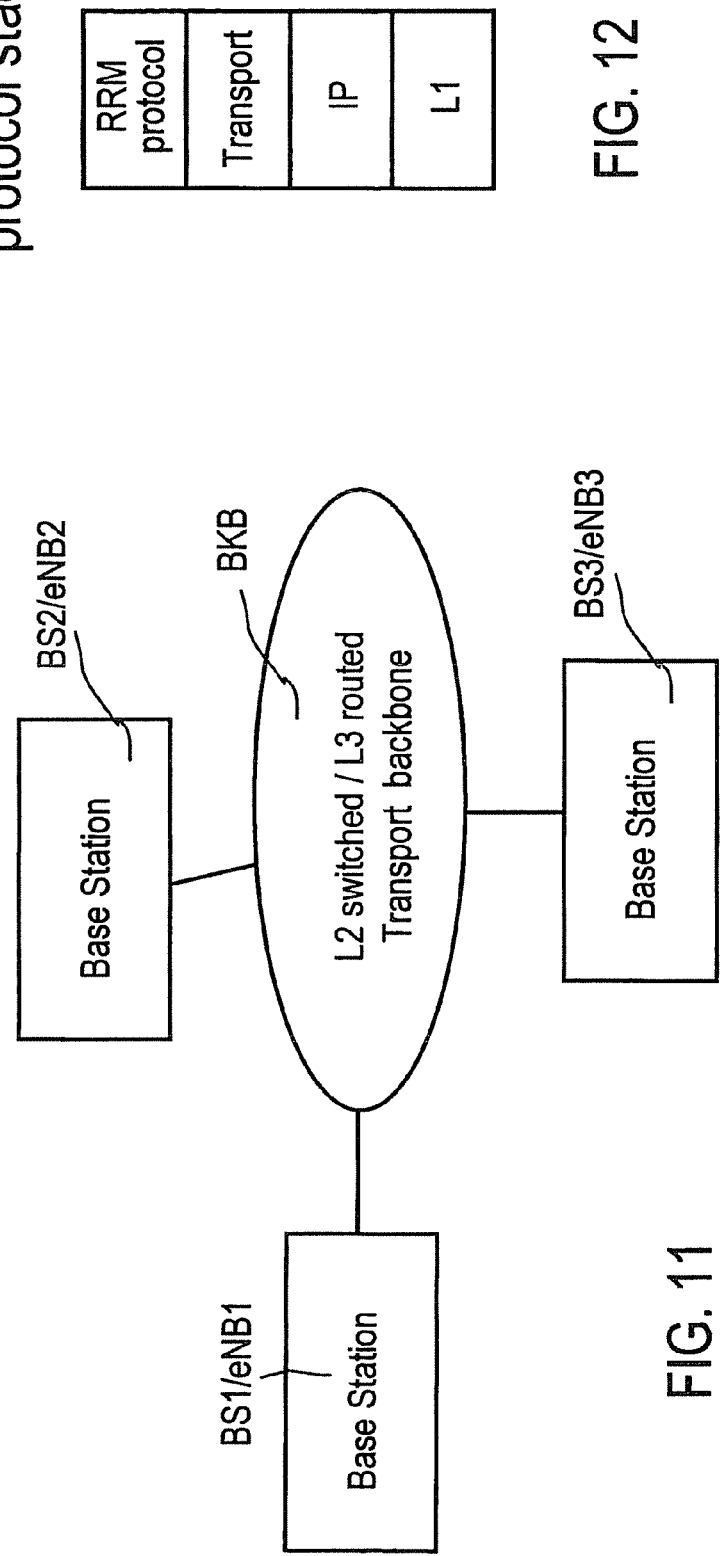
FIG. 12
FIG. 11

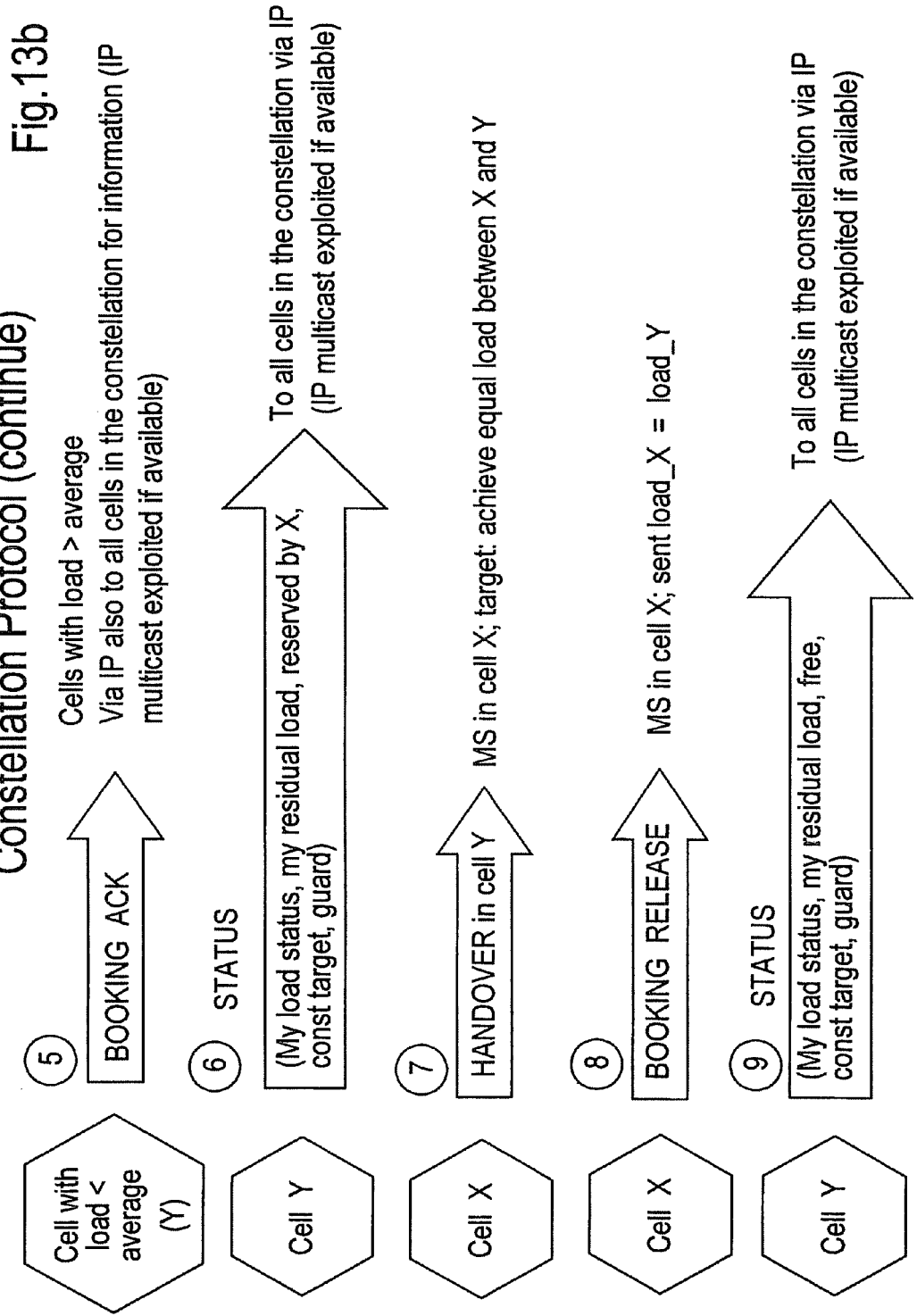

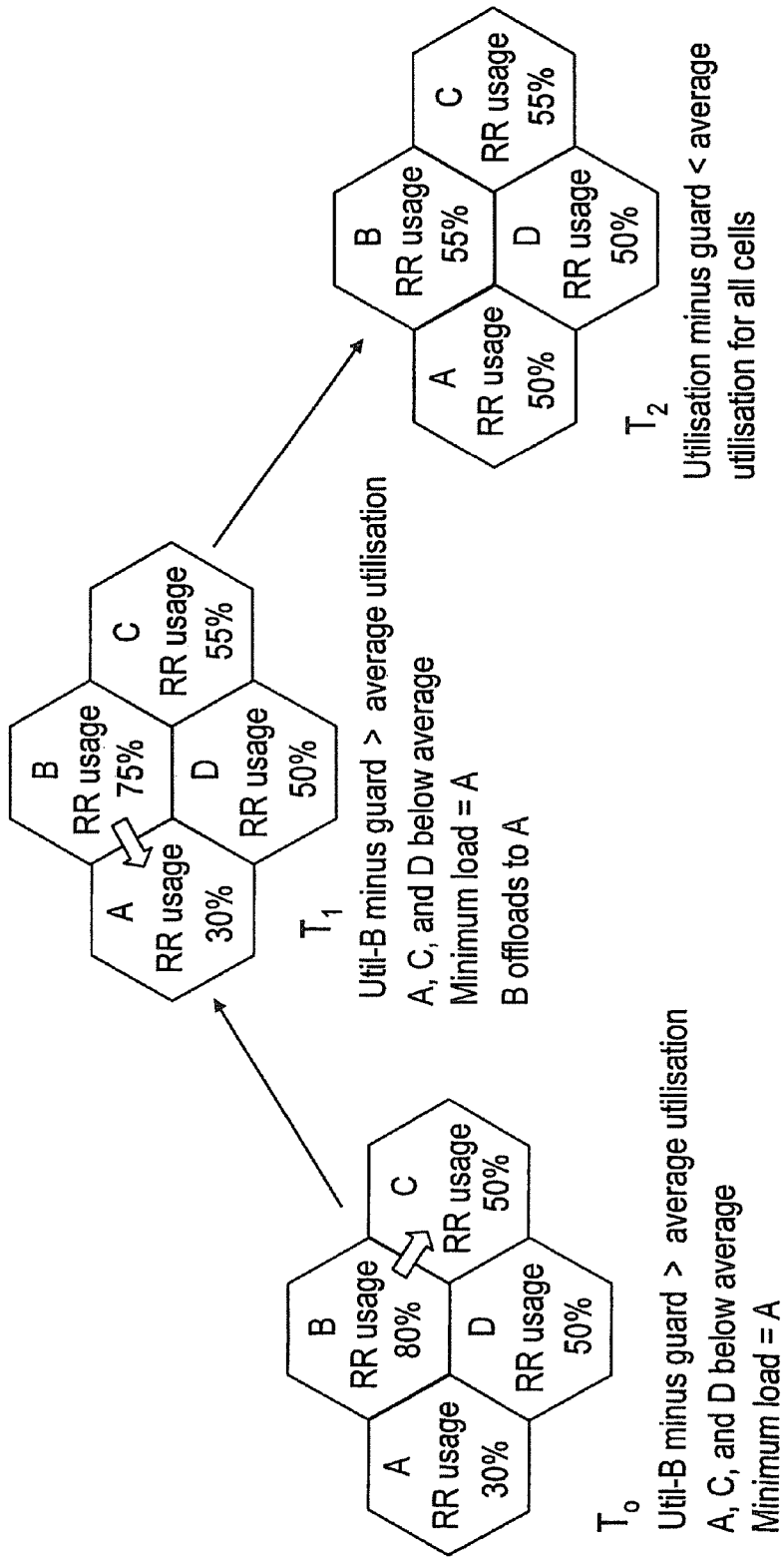

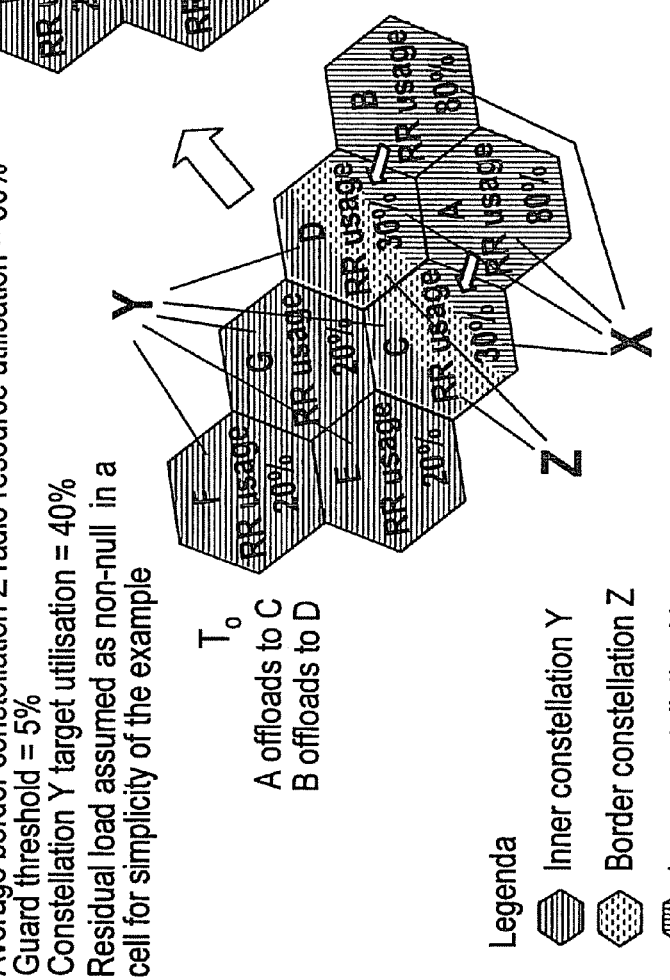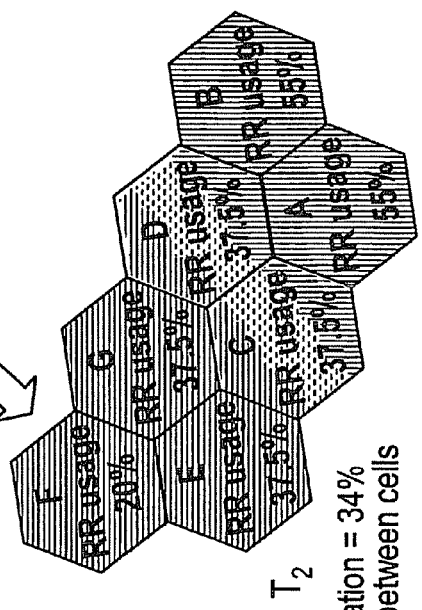
Fig. 15

METHOD TO BALANCE TRAFFIC LOAD BETWEEN NEARBY LTE/WIMAX CELLS GROUPED INTO INNER AND BORDER CONSTELLATIONS

CROSS REFERENCE TO RELATED APPLICATIONS

This application is based on and hereby claims priority to International Application No. PCT/EP2007/007489 filed on Aug. 27, 2007, and European Application No. EP06425599, filed Aug. 30, 2006, the contents of both of which are hereby incorporated by reference.

BACKGROUND

1. Field

The embodiments discussed herein relate to the field of cellular communication networks, and more precisely to a method to balance traffic load between nearby LTE/WiMAX cells grouped into inner and border constellations.

2. Description of the Related Art

Long Term Evolution (LTE) and WiMAX systems being defined by 3GPP and IEEE/WiMAX Forum, respectively, are characterized by a simplified Radio Access Network (RAN) structure in which the functions of the centralized controller, e.g. the RNCs in the UTRAN, are partially shifted to the base stations in order to reduce latencies and improve the quality of service (QoS) provided to the end user. The results are enhanced Nodes B (eNB) in the LTE architecture and enhanced Base Stations BS in WiMAX. Both architectures allow base station to base station communication for coordination purposes. The LTE provides this via specific interfaces between eNBs (X2), while current WiMAX standards rely on the availability of a mediation function provided by another Access Serving Network (ASN) Network Element (ASN-GW), since a BS to BS interface (R8 reference point) is not clearly defined yet.

Existing WiMAX specifications define a hierarchical Radio Resource Management (RRM) architecture in which a Radio Resource Controller (RRC) checks the radio resource utilization of Radio Resource Agents (RRA). RRC entities may be mapped to base stations or to centralized controllers (ASN-GWs) and may coordinate each other via the ASN-GW. The present FIG. 1 is reported or obtained from the following draft: WiMAX Forum stage 2 specification: "FIG. 7-92—RRA and RRC Collocated in BS".

The present FIG. 2 is reported or obtained from the following WiMAX Forum stage 3 specification: "FIG. 5 26—Inter-ASN RRM Communication is RRC to RRC Communication. Note: A similar figure occurs for intra-ASN R4 communication; two ASN GWs within a single ASN communicate via R4; from RRM view, this is RRC-RRC communication like on inter-ASN R4".

The present FIG. 3 is a Table reported or obtained from the following draft: WiMAX Forum stage 3 specification: "Table 5 43—RRM Procedures, Messages, Mapping to Reference Points".

As far as the WiMAX profiles concept is concerned, making reference to the preceding figures, WiMAX Forum stage 2 defines three Access Serving Network (ASN) profiles, which correspond to three distinct mapping of functionality to BS and ASN-GW network elements. In this context we are just interested in the Radio Resource Management (RRM) functionality, although the profile concept considers other functional mappings as well. In Profile A, the ASN-GW is in charge of centralized RRM. In Profile C, no central RRM is defined and each BS has a local RRM entity. Profile B does not define a specific functional to physical mapping, allowing the equipment manufacturer to decide. The profile concept is defined only for WiMAX but not for LTE.

The present FIG. 4 is reported or obtained from the following draft: WiMAX Forum stage 3 specification: "FIG. 5-27—Per-BS Spare Capacity Reporting Procedure".

FIGS. 5 and 6 represents current network architectures for WiMAX (Profile C) and LTE, respectively. With reference to FIG. 5, we see two WiMAX base stations BS1 and BS2 of the type reported in FIG. 1 interfaced to a first network element ASN GW1 through R6, and a third base station BS3 interfaced to a second network element ASN GW2 also through R6; the two ASN GW1 and ASN GW2 are interfaced through R4. All the depicted elements BS1, BS2, BS3, ASN GW1, and ASN GW2 are interconnected by an IP backbone encompassing the R6 and R4 connections. With reference to FIG. 6, we see two LTE base stations eNB1 and eNB2 directly connected to each other through an X2 interface and to a centralized controller Access GW through respective S1 interfaces. Also in LTE all depicted elements eNB1, eNB2, and Access GW are interconnected by an IP backbone encompassing the X2 and both S1 connections.

The international patent application PCT/EP2006/06033 filed by the same Applicant on 23 Jun. 2006 claims (for the common subject matter) the priority date of the european patent application EP 05425456.0 filed on 24 Jun. 2005, which in its turn constitutes prior art under the Article 54(3) EPC. PCT/EP2006/06033 claims a method for sharing signaling load between radio access network nodes (RNC/eNB), belonging to a mobile radio communication system (UMTS), via a transport network (Cluster Backbone) interconnecting said nodes, where each node processes the Radio Resource Control signaling to serve voice calls and/or packet data transmissions and measures processing load, periodically, in order to detect an incoming congestion state of the internal processing means, characterized in that includes the following steps:

a) spreading around processing capacity status information from each node to other nodes of a cluster of nodes constituting an independent signaling processing pool;
b) issuing a processing capacity request from a congested or nearby congested node to a target node of said cluster having residual processing capacity;
c) rerouting the incoming signaling from the requesting node to the target node which accepts said request as serving node;
d) processing the rerouted signaling by the serving node on behalf of the requesting node;
e) rerouting the outcome of the processed signaling from the serving node to the requesting node.

FIG. 7 shows the network infrastructure to carry out the method for sharing signaling load disclosed in the aforementioned PCT/EP2006/06033; it resembles the preceding FIG. 6 with the only exceptions that the IP backbone includes the only X2 interface between eNB1 and eNB2 for transmitting Processing Status signaling. PCT/EP2006/06033 differs from EP 05425456.0 by the only fact that the involved radio access network nodes also include peer eNBs of the future LTE system.

The following open issues exist:
  The WiMAX standard does not define means for performing complex RRM tasks like traffic load balancing. The existing primitives (Spare capacity request/report) may not be sufficient:
  they allow RRC to be informed of the load status of controlled and neighbor cells but, they do not provide a way for preventing the flooding of unloaded cells with contemporaneous requests made by several RRCs. When several RRCs detect an unloaded part of the system, they may contemporaneously decide to offload their excess traffic to it, thereby causing an overload condition.

The WiMAX standard presently does not describe in detail the communication between RRCs located in BSs connected to the same ASN-GW.

We are not aware of solutions described in current LTE standards (in progress); sections 15.2.3 "De centralized RRM" and 15.2.4 "Load balancing control" of TS 25.xxx "E UTRAN overall description stage 2" are currently empty and section 6.12.3 "RRM architecture in LTE" of TR R3.018 "Evolved UTRA and UTRAN radio access architecture and interfaces" provides a generic overview only.

Since in the LTE architecture, no centralized radio resource control functionality is available, any optimization task, like e.g. advanced Radio Resource Management (RRM) techniques, has to rely on a RRM function distributed among the available eNBs. WiMAX Profile C, in which no centralized RRM controller exists, experiences a similar situation.

On the other hand, the teaching of PCT/EP2006/06033, although referred to peer eNBs, is exclusively directed to balance Layer 3 signaling processing but not radio resources. An overload of signaling processing is not mandatorily tied to traffic overload and, in any case, the action taken by a relaxed processor is to take over signaling from a busy one with transparency, but not to promote traffic load balance.

SUMMARY

The embodiments discussed herein aim at solving the problem of achieving RRM optimizations in a distributed environment in which no central RRM controller exists. In particular, cell traffic load balancing should be achieved by exchanging radio resource utilization information between base stations and by offloading busy cells via standard handover (HO) procedures, in order to prevent flooding situations.

The embodiments achieve this aspect by providing a method for balancing traffic load between nearby cells of a mobile radio communication network, said cells being configured as peer network nodes interconnected by a transport network, e.g. an IP backbone, where each cell measures its radio resource utilization and calculates the average state of the cell group (constellation) to which it belongs, periodically, in order to monitor the relevant traffic load. The method can include a preliminary off line step of:

grouping nearby cells into constellations, and then the following steps on line in each constellation:

exchanging among all cells in the constellation their actual and residual traffic load status information;

calculating the average actual traffic load by all cells in the constellation and compare it to their actual traffic load;

booking, by cells with actual traffic load over the average, unreserved adjacent cells with the lowest actual traffic load and the highest residual traffic load as targets for traffic offloading;

commanding by each booking cell a fraction of its mobile terminals to execute handovers towards target cells accepting to be reserved;

releasing the reserved target cells.

Two constellation types can be defined:

Inner constellation: group of nearby cells, not necessarily hosted by the same base station site and belonging to a well defined geographic area, which are characterized by a common target utilization of the radio resources and by a common guard threshold for traffic load.

Border constellation: the set of cells which are at the border between two inner constellations at least. Target utilization and guard threshold are not defined for the border constellation. Instead, cells in a border constellation actually belong to more than one inner constellation and have visibility over their target utilization and guard threshold parameters.

Border constellation cells are enabled to trigger traffic offloading only when the average actual traffic load of the neighbor constellation is lower than its target utilization parameter A cell can at the same time be part of two or more constellations via the "border constellation" concept. In this case it will run two or more independent instances of the load balancing algorithm and will consider two or more independent "constellation target utilizations" when deciding whether to offload traffic to a neighbor constellation.

Based on the above, the definition of border constellations allows "traffic osmosis" between constellations.

The exploitation of an IP backbone that interconnects base stations and of multicast capabilities provided by this backbone (if available and applicable). If IP multicast is not available, several point to point messages may be used as fallback.

Handovers affect mobile stations for all type of supported services, such as:

Connectionless packet data transmissions.

Provision of QoS-enabled services over connectionless packet data bearers. WiMAX supports several service classes, like: Real Time-Variable Rate, enhanced Real Time-Variable Rate, Unsolicited Grant Service, which provide support to quality demanding services, e.g. VoIP (Voice over IP) can be supported via eRT-VR or UGS. Additional service classes (Non Real Time-Variable Rate, Best Effort) are provided for services with lower, or poor, quality requirements. Obviously, equivalent concepts will be developed for LTE.

In WiMAX 802.16e the handovers are defined for all supported service classes, data service enclosed.

Available radio resources in a cell an directly correlated to the available traffic load sustainable by the cell.

Available residual traffic load of the cells is information useful to manage situations of non uniformity of traffic load inside the constellations. Non uniformity of traffic load among the cells is a consequence of the Erlang law, generally used to calculate traffic inside a cell. Based on this statistic law, it is not certain a priori that all cells in a constellation might reach the same load, because this depends on the cell dimensioning that can differ to each other.

Offloading is also triggered by a cell when its residual traffic load is null or under a minimum configurable threshold.

Preferably, booked cells have their resource utilization (actual traffic load) below the constellation average.

Offloading is iterated until the actual traffic load of accepting and requesting cells is considered equal as more as possible, or the residual traffic load of the accepting cells is null.

The STATUS message periodically transmitted by the cells with their traffic load information, also informs the other cells about whether they are currently reserved by another cell as target for traffic offloading.

There must obviously be a message for refusing BOOKING requests (BOOKING NACK), which has not been described hereafter for the sake of simplicity.

All considered thresholds and values must be configurable.

Profitably, the embodiments provide a solution to the problem of optimizing the use of radio resources in loaded WiMAX profile C and LTE environments, in which a central Radio Resource Management function is not available.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 3 shows a Table of: RRM primitives, involved peers, and communication profile, according to WiMAX Forum stage 3 specification applicable to both architectures of FIG. 1 and FIG. 2;

FIG. 9 shows a variant of WiMAX architecture of FIG. 5 for Base Stations directly connected as in FIG. 1, usable with the method of the invention;

FIG. 10 shows a variant of the architecture of FIG. 2 for directly connected WiMAX/LTE Base Stations, usable with the method of the invention;

FIG. 11 shows a very general network architecture usable with the method of the invention with Base Stations indirectly connected through a transport backbone;

FIG. 12 shows a possible protocol stack running at the interfaces with the used Base Stations;

FIGS. 13a and 13b show all sequential steps of traffic load balancing method (constellation protocol) of the present invention running for any constellation of FIG. 8;

FIG. 14 shows an example of the constellation protocol for traffic load balancing in inner constellations;

FIG. 15 shows an example of successful offloading to neighbor constellation;

DETAILED DESCRIPTION OF THE PREFERRED EMBODIMENT

Figure 1:
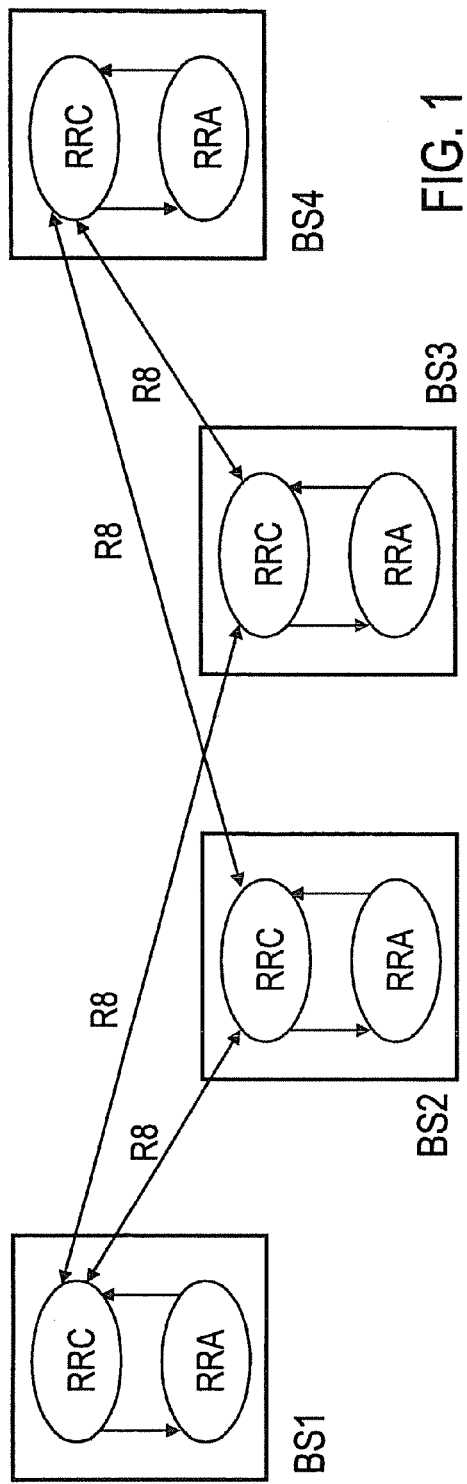
FIG. 1 shows a peer to peer Base Station network architecture according to WiMAX Forum stage 2 specification.
Figure 2:
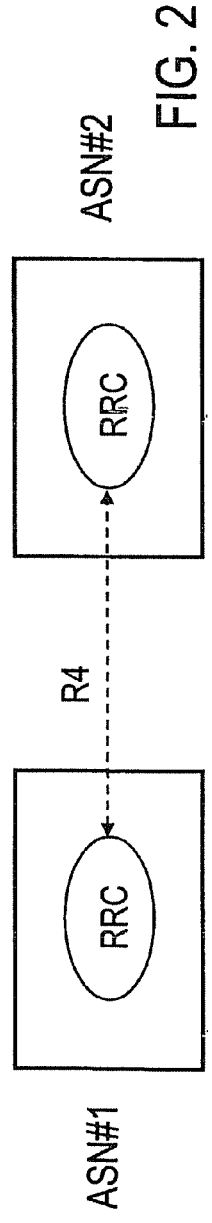
FIG. 2 shows an inter ASN Controller link according to WiMAX Forum stage 3 specification.
Figure 4:
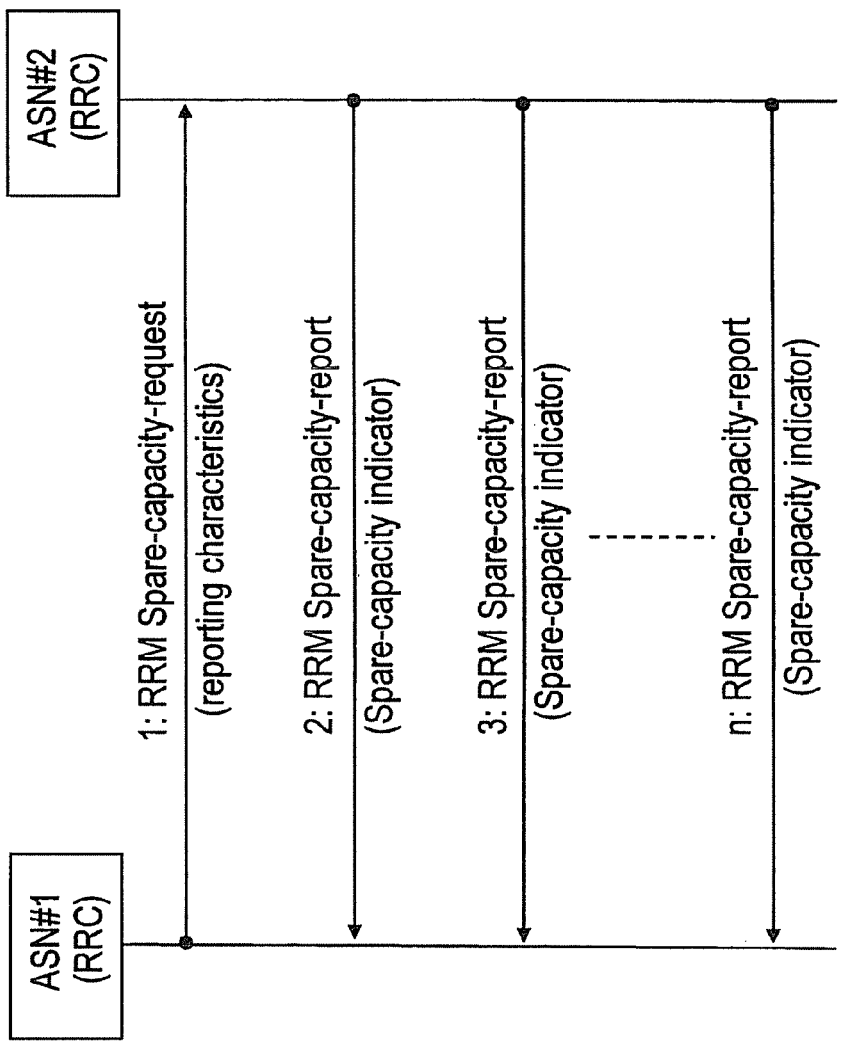
FIG. 4 shows a message time diagram of the Spare Capacity Reporting procedure according to WiMAX Forum stage 3 specification applicable to both architectures of FIG. 1 and FIG. 2.

Reference will now be made in detail to the preferred embodiments, examples of which are illustrated in the accompanying drawings, wherein like reference numerals refer to like elements throughout.

Figure 8:
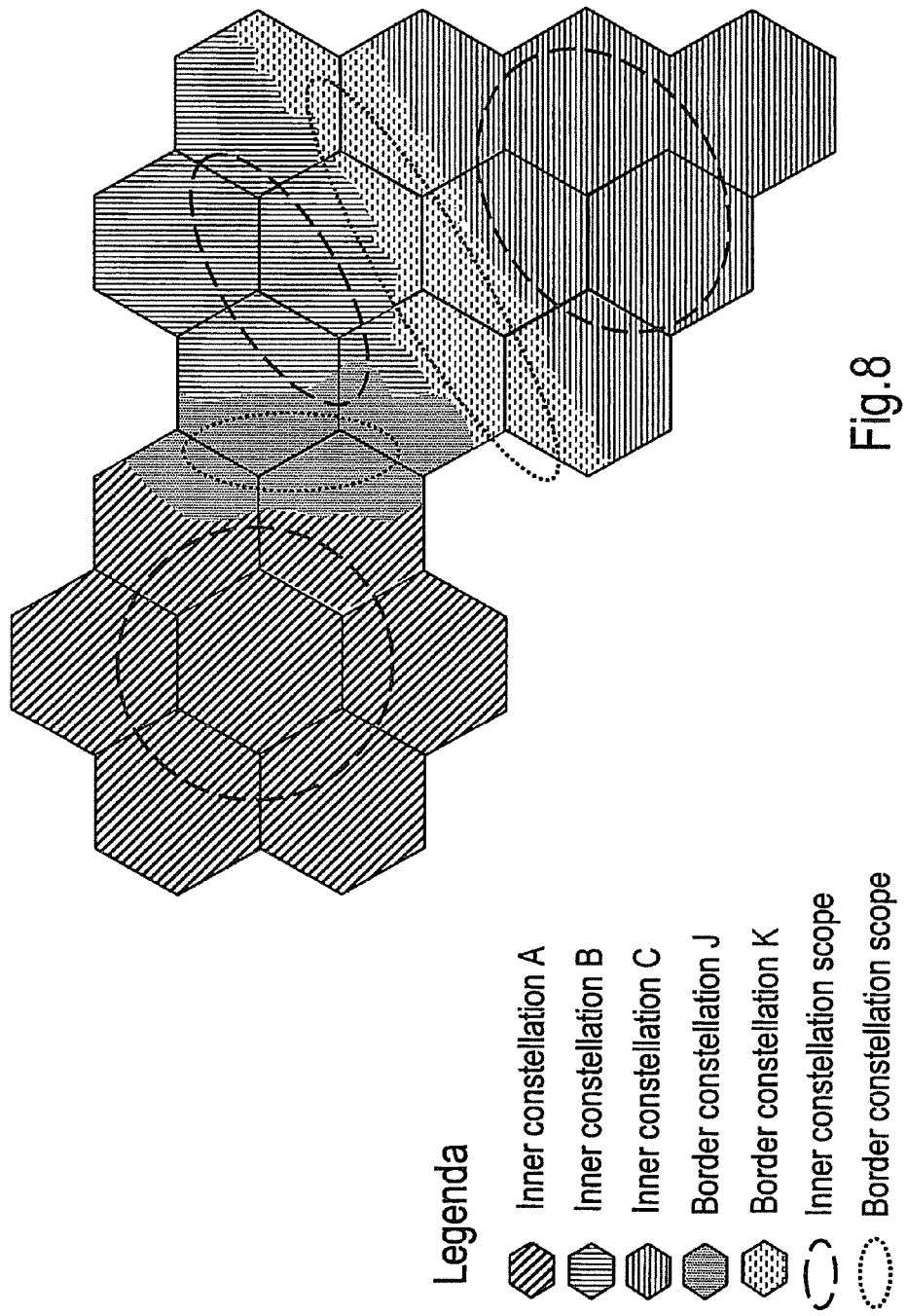
FIG. 8 illustrates, with different fillers, the concept of inner and border type of cell constellations, according to a preliminary step of the method of the present invention.

With reference to FIG. 8 we see a partial cellular network scenario including three so called "inner constellations" of cells (indicated by dashed ellipsis and different fillers) and two border constellations of cells (indicated by dotted ellipsis and different fillers). The cells of any constellation are hosted by respective Base Station sites, not necessarily by the same, and an IP backbone (not shown) or other transport network interconnects the base stations. The first three fillers indicated in the Legend are associated to the inner constellations, while the remaining are associated to the border constellations. It is visible at glance from the figure that the border constellations include cells common to two neighbor inner constellations. Let us consider the question of constellations from the mathematical point of view and define the various types of constellations as corresponding sets of nearby cells; with this assumption the border constellation is the intersection set between two (or more) constellations (inner).

Figure 5:
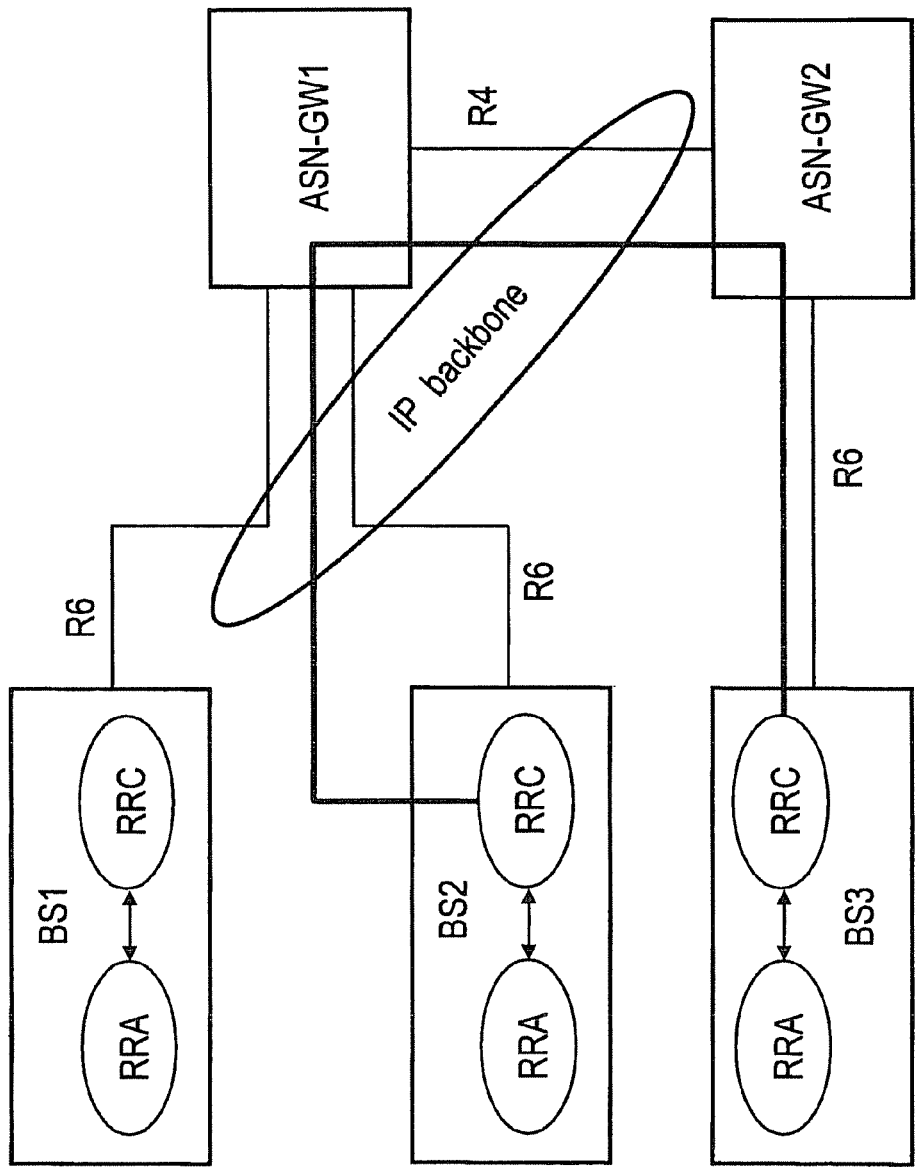
FIG. 5 shows a current WiMAX network architecture for implementing peer to peer Base Station communication.
Figure 6:
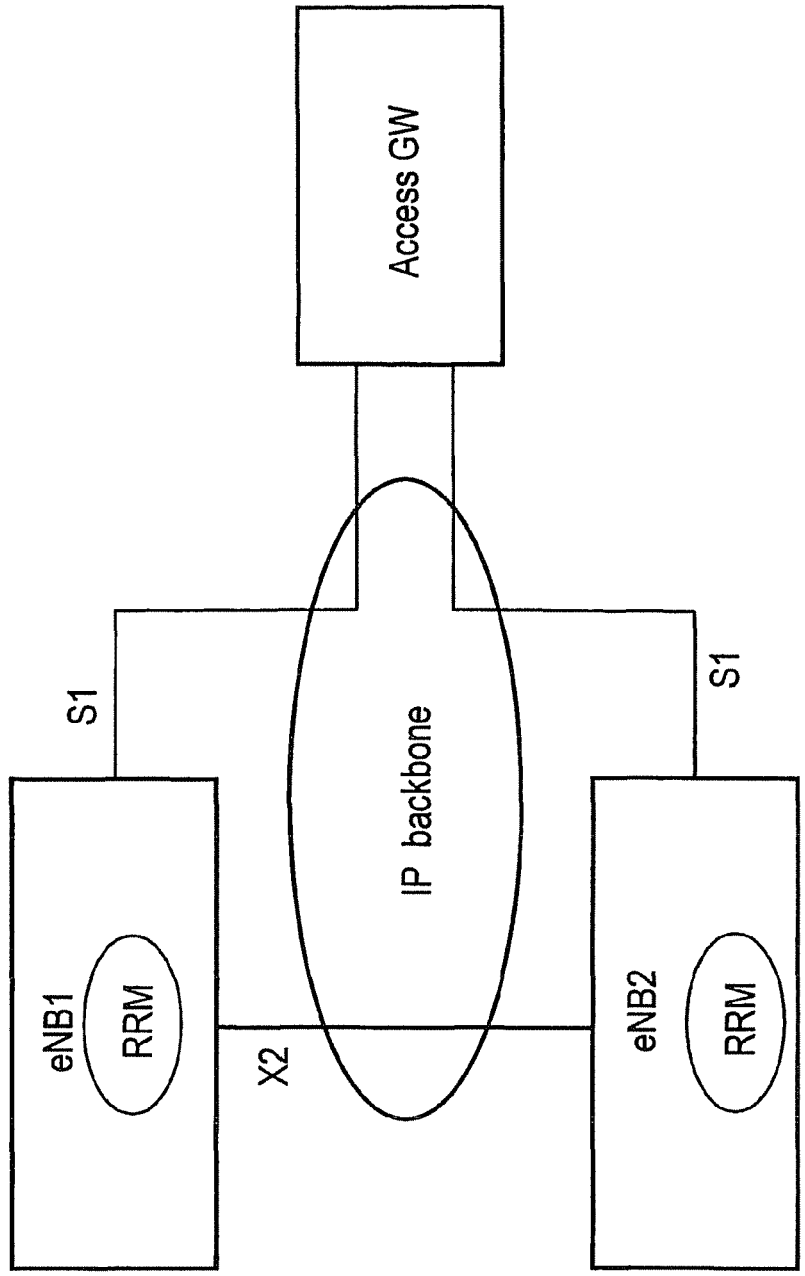
FIG. 6 shows a current LTE network architecture for implementing peer to peer Base Station communication.
Figure 7:
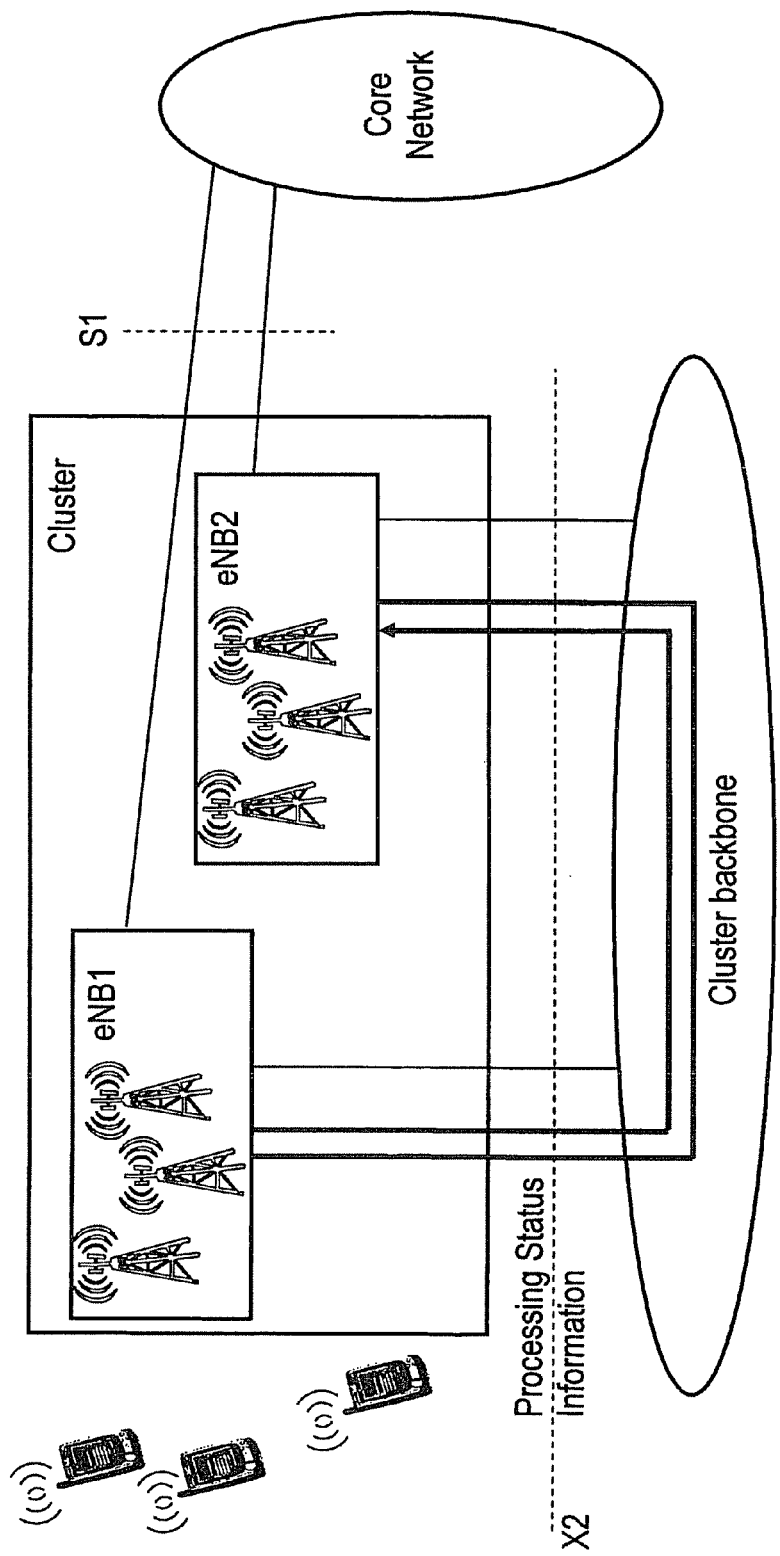
FIG. 7 shows a variant of the architecture of FIG. 6 described in a preceding patent application of the same Applicant.

A simplified WiMAX architecture suitable to implement the method of the embodiments is depicted in FIG. 9. Differently from FIG. 5, there are two Base Stations BS1 and BS2 directly interconnected through the R8 interface. As LTE is concerned, the simplified network architecture depicted in FIG. 6 is also usable to implement the method. Another extremely simplified network architecture valid both for WiMAX and LTE (but also for any other network) is visible in FIG. 10 where two Base Stations BS1/eNB1 and BS2/eNB2 are directly interconnected through the R8/X2 interface. A different network architecture usable with the method, is visible in FIG. 11, where three Base Stations BS1/eNB1, BS2/eNB2, and BS3/eNB3 are indirectly interconnected through a transport backbone BKB (preferably of the IP type with multicast capacity). A possible protocol stack running at the interfaces with Base Stations of the preceding FIGS. 6, 9, 10, and 11 is reported or shown in FIG. 12.

In operation, the purpose of R8 and X2 interfaces is to allow base station interconnection without relying on network elements other than transport nodes. The interconnection may in principle be direct, but it is more likely to be achieved via a transport backbone. This backbone can either operate at L1/L2 or act as a full L3 routed network. L1 is typically Ethernet. Other physical layers are also possible, e.g. aggregated E1/T1, (aggregated) T3, SDH/SONET IP is assumed at network layer protocol. Both IPv4 and IPv6 variants are considered. This layer may be terminated just in the base stations (L2 switched transport networks) or may be interpreted also in the transport network (L3 routed transport networks). In case of L3 routed networks, the availability of IP multicast capabilities in the IP backbone are considered as useful for the embodiments, since they allow the method to achieve an efficient distribution of broadcast information.

At the transport layer a connectionless protocol like UDP is more indicated for broadcasting status information than a connection oriented one, like TCP or SCTP, that should in principle be used. Using UDP the RRM protocol has to provide error detection and correction (e.g. by retransmission) capabilities for messages like BOOKING as described below.

In the following description, the term "traffic load" is used to indicate the "actual traffic load".

Figure 13A:
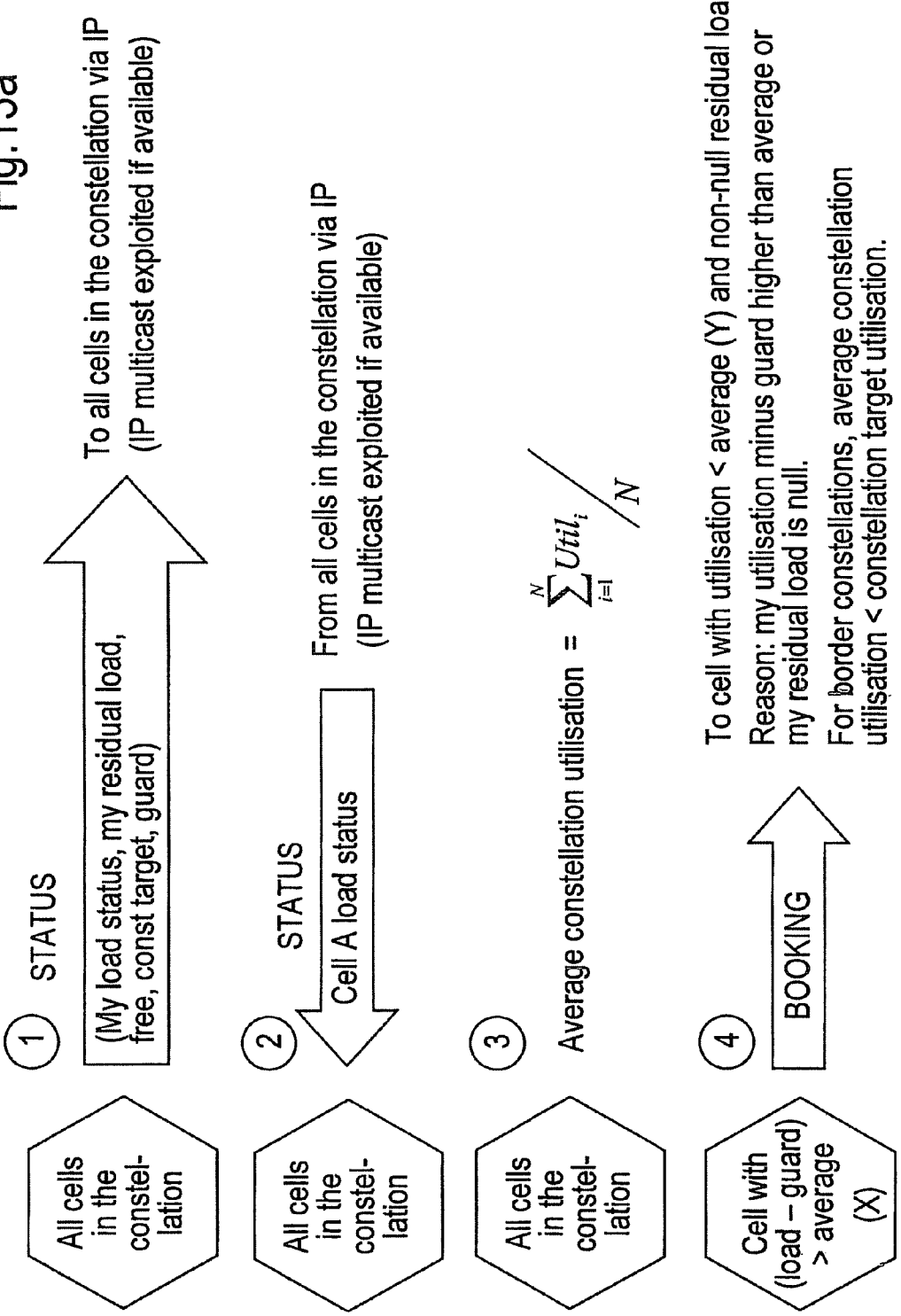

With reference to FIGS. 13a and 13b, the traffic load balancing method of the embodiments in a constellation proceeds like this:

1. STATUS broadcasting step. All cells in the constellation will periodically broadcast a STATUS message. In the WiMAX case, this can be obtained either by modifying the message "RRM Spare Capacity Report" or by creating a new message ad hoc for this purpose. A message will have to be defined in the LTE environment. In both cases the STATUS message shall contain:

radio resources utilization status of the cell;
residual traffic load information;
the booking status (all "free" in the beginning) of the cell.

In addition, at least one of the cells in the constellation (randomly selected by the network operator) also transmits as part of STATUS:

the constellation target radio resource utilization;
the constellation guard threshold.

This additional information is used to trigger load balancing (see below). Defining a target constellation radio resource utilization allows the method to take into account constellation specific dimensioning criteria, which bring to different possible target utilization values. It is necessary to take this into account when offloading traffic between constellations. Defining a guard threshold allows the method to avoid triggering load balancing too frequently. The adopted broadcast method ensures that all cells of the constellation become aware of the information. It is important to note that the two values above may be transmitted by any cell in the constellation which has received the information from the operator; this provides significant robustness.

2. STATUS reception step. All cells in the constellation will periodically receive the STATUS messages from the other cells in the constellation.

3. Averaging step. On the basis of the received periodic radio resource utilization status messages, all cells in the constellation will:

keep track of the current utilization of each cell in the constellation and of their residual utilization;
calculate the average constellation utilization;
compare the average utilization to their traffic load.

4. BOOKING step. Cells will trigger load balancing on the following basis:

Measured average constellation utilization is lower than the constellation target utilization. This criterion applies to border constellations only in order to avoid overloading the neighbor constellations.

The difference between current cell radio resource utilization and the guard threshold exceeds the average constellation value. This criterion applies to both constellation types.

Their residual load (not the one received via STATUS from other cells) is null or under a minimum configurable threshold.

The affected cells will in this case try to book other cells (preferably but not mandatory if the utilization of which is below the constellation average) for call offloading via the BOOKING message (new WiMAX like or LTE like message). A loaded cell will try to book the adjacent one with the lowest traffic load and the highest residual traffic load. Cells with null residual traffic load will not be considered as targets regardless of their current traffic load.

5. BOOKING ACK step. After acknowledging the booking via the BOOKING ACK message (new WiMAX like or LTE like message), the accepting cells will periodically broadcast their booking status: "Reserved by base station X" along with their current resource utilization status, residual load, constellation target status and guard threshold, in their STATUS messages.

7. Traffic offloading step. Requesting cells will now offload calls and/or data services by sending existing HANDOVER messages to a fraction of served Mobile Stations indicating the selected accepting cells as targets, until the traffic load of accepting and requesting cells is considered equal or the residual traffic load of the accepting cells is null.

Mobile Stations served by a requesting cell are firstly sorted by descent most favourable conditions for handover towards the accepting cell, then their individual supported traffic (e.g. bitrate) is summed up staring from the top value until the amount of traffic load to be diverted is reached; the Mobile Stations considered in the summation are commanded to execute handovers.

8. BOOKING RELEASE step. After balancing the load, requesting cells will release the accepting ones via the BOOKING RELEASE message (new WiMAX like or LTE like message).

9. Updating STATUS step. After being released, accepting cells will include a "free" reservation status in the next STATUS message broadcast.

With reference to FIG. 14, we see an example of the constellation protocol at work for balancing traffic load inside an inner constellation including four cells called A, B, C, and D. The starting situation of radio resource utilization inside the cells, indicative of their traffic load at time To, is the following: A=30%; B=80%; C=50%; and D=50%. The average radio resource utilization is 52.5%. A guard of 5% is adopted for the percentage of resource utilization. Only cell B has a traffic load minus guard over the average (75>52.5); it begins to offload towards a target cell selected among the remaining ones with the aim of balancing traffic load as much as possible. This purpose is reached by means of two sequential offloading steps, a first one starting at time To towards cell C for increasing its load by 5% up to 55%, and a second more consistent one starting at time T1 to raise up from 30% up to 50% the load of cell A. Adopting an alternative one step strategy for maximum offloading to cell A, the outcome should be lower than the final balance at time T2.

With reference to FIG. 15, we see an example of the constellation protocol at work for successfully offloading to a neighbor constellation. The depicted scenario includes two inner constellations X and Y, plus a border constellation Z merged with both of them. More precisely, the inner constellation X includes four cells: A, B, C, and D; the inner constellation Y includes five cells: C, D, E, F, and G; while the border constellation Z includes the shared cells C and D. The starting situation of radio resource utilization inside the cells, indicative of their traffic load at time To, is the following: A=80%; B=80%; C=30%; D=30%, E=20%; F=20%; G=20%; The average radio resource utilization of constellation X is 55%. The average radio resource utilization of constellation Y is 24%. The average radio resource utilization of constellation Z is 30%. A guard of 5% is adopted to the percentage of resource utilization. A target of 40% is assumed for radio resource utilization of the inner constellation Y The starting average load of 24% for the inner constellation Y, largely under the target value, suggests offloading from the border constellation Z, but the average load of this constellation at 30% is too low in respect of the average load of inner constellation X at 55% obtained with largely unbalanced loads. Offloading shall be attempted in two steps starting from the inner constellation X towards Z and then from Z to the neighbor Y. Starting at time To the equally loaded cells A and B offload to the equally loaded cell C and D, respectively, for increasing traffic load of C and D up to 55%. At time T1 traffic load of inner constellation X is completely balanced at the average load value of 55%, largely over the average load value of Y constellation: this suggests traffic osmosis towards the neighbor constellation Y. At time T1 the average traffic load of inner constellation Y is 34% with results lower than the target value of 40% and the condition for offloading from border constellation Z is fulfilled. Starting at time T1, during the second balancing step the equally loaded cells C and D offload to the equally loaded cell E and G, respectively, for increasing traffic load of C and D up to 37.5%, The final distribution of traffic load between all cells at time T2 appears as much more balanced as the initial situation.

Figure 16:
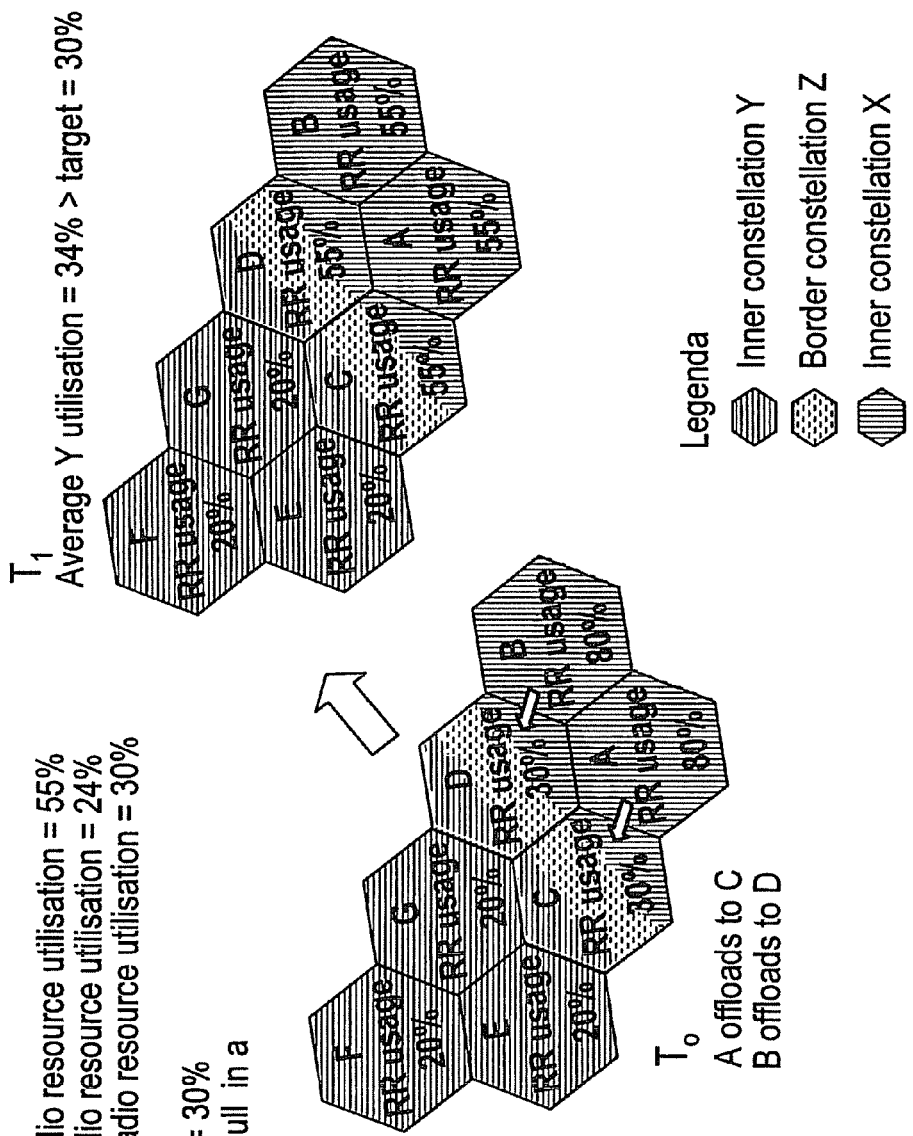
FIG. 16 shows an example of unsuccessful offloading to neighbor constellation.

With reference to FIG. 16, we see an example of unsuccessfully offloading to neighbor constellation due to the selection of a poor value for target utilization of radio resources. The staring scenario at time To is the same as the preceding one of FIG. 15, with the only exception of adopting a 30% target value for traffic load of inner constellation Y At the end of the first offloading step the situation at time T1 is the same as the one illustrated in the preceding FIG. 15, but now the second offloading step towards the constellation Y can not be carried out because the average radio resource utilization of the inner constellation Y is 34%, with results over the selected target value of 30%.

Although the invention has been described with particular reference to a preferred embodiment, it will be evident to those skilled in the art, that the present invention is not limited thereto, but further variations and modifications may be applied without departing from the scope of the claims.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for balancing traffic load between nearby cells of a mobile radio communication network, the cells being configured as peer network nodes interconnected by a transport network, where each cell measures radio resource utilization, periodically, in order to monitor relevant traffic load, comprising: offline grouping of nearby cells belonging to a well defined geographic area, which are characterized by a common target utilization of the radio resources and a common configurable guard threshold into at least a first constellation and a second constellation and a border constellation formed by the cells at the border of the first constellation and the second constellation; online exchanging among all cells in the constellations actual and residual traffic load status information; online calculating an average actual traffic load by all cells in the constellations and comparing the average to the actual traffic load; online booking, by cells the difference between the actual traffic load and the guard threshold exceeding the average, unreserved adjacent cells with a lowest actual traffic load and a highest residual traffic load as targets for traffic offloading; online commanding by each booking cell, a fraction of booking cell mobile terminals to execute handovers towards target cells that have been reserved, where a cell of the border constellation is enabled to trigger traffic offloading from the first constellation to the second constellation only when the average actual traffic load of the second constellation is lower than the target utilisation parameter of the second constellation; and online releasing the reserved target cells.

2. The method of claim 1, wherein cells which have been reserved broadcast booking status periodically with an indication of the cell to which the cells are reserved.

3. The method of claim 2, wherein after traffic load has been balanced the cells that have been reserved broadcast a booking release message.

4. The method of claim 3, wherein the booking release message is followed by broadcasting an updated status message including a free reservation status indication.

5. The method of claim 1, wherein booking and commanding are iterated until the actual traffic load of received and requesting cells is considered equal.

6. The method of claim 1, wherein booking and commanding are iterated until a residual load of the reserved cells is null.

7. The method of claim 1, wherein the lowest actual traffic load of unreserved adjacent cells is below the constellation average.

8. The method of claim 1, wherein booking and commanding are further executed when a residual traffic load falls under a minimum configurable threshold.

9. The method of claim 1, wherein a transport network is configured as an IP backbone having multicast capabilities.

* * * * *